United States Patent
Englert et al.

(10) Patent No.: US 9,337,688 B2
(45) Date of Patent: May 10, 2016

(54) ENVIRONMENTAL SYSTEM AND MODULAR POWER SKID FOR A FACILITY

(71) Applicant: Modular Power Solutions, Inc., San Jose, CA (US)

(72) Inventors: Matthew John Englert, Morgan Hill, CA (US); Simon D. Harkins, San Jose, CA (US); Christopher J. Crosby, Jr., Dallas, TX (US); Steven Emert, Hayward, CA (US)

(73) Assignee: Modular Power Solutions, Inc., San Jose, CA (US)

( * ) Notice: Subject to any disclaimer, the term of this patent is extended or adjusted under 35 U.S.C. 154(b) by 525 days.

(21) Appl. No.: 13/875,249

(22) Filed: May 1, 2013

(65) Prior Publication Data
US 2013/0293017 A1 Nov. 7, 2013

Related U.S. Application Data

(60) Provisional application No. 61/641,391, filed on May 2, 2012.

(51) Int. Cl.
*H02J 9/04* (2006.01)
*H02J 9/06* (2006.01)

(52) U.S. Cl.
CPC ... *H02J 9/04* (2013.01); *H02J 9/06* (2013.01); *Y10T 307/62* (2015.04)

(58) Field of Classification Search
CPC ............ H02J 9/04; H02J 9/06; Y10T 307/62; H05K 5/04; H05K 13/00; H02K 5/04
USPC .......................................................... 307/65
See application file for complete search history.

(56) References Cited

U.S. PATENT DOCUMENTS 3,924,370 A 12/1975 Cauceglia et al.
5,477,649 A 12/1995 Bessert
(Continued)

FOREIGN PATENT DOCUMENTS

| GB | 2467808 A | 8/2010 |
|----|-----------|--------|
| WO | WO 2010/138771 A1 | 12/2010 |
| WO | WO2013166327 A1 | 11/2013 |

OTHER PUBLICATIONS

"Hardening of Buildings and Structures", 2 pages, Hardened Structures Blast and Structural Engineering Team, Hardened Structures, Hardened Shelters, LLC downloaded Apr. 28, 2014 from http://www.hardenedstructures.com/hardening-of-buildings.php.
(Continued)

*Primary Examiner* — Jared Fureman
*Assistant Examiner* — Michael Warmflash
(74) *Attorney, Agent, or Firm* — Rutan & Tucker, LLP

(57) ABSTRACT

A set of two or more modular-critical-power-distribution skids are arranged in a redundant power center configuration to supply power to electrical loads in a modular data center facility. The skids are housed in hardened buildings. The uninterruptable power supply is electrically and mechanically connected into the multiple power distribution cabinets, all of which are mounted onto a steel framed support structure, which supports a weight of those uninterruptable power supplies and power distribution cabinets. The environmental control system controls a cooling system for the modular-critical-power-distribution skids. Electrical power from the A-side and B-side connects in a redundant power configuration to electrical loads in the cooling system.

20 Claims, 7 Drawing Sheets

(56) References Cited

U.S. PATENT DOCUMENTS

| | | | |
|---|---|---|---|
| 6,019,322 | A | 2/2000 | Shimizu |
| 6,651,393 | B2 | 11/2003 | Don et al. |
| 7,278,273 | B1 | 10/2007 | Whitted et al. |
| 7,724,513 | B2 | 5/2010 | Coglitore et al. |
| 7,738,251 | B2 | 6/2010 | Clidaras et al. |
| 7,971,446 | B2 | 7/2011 | Clidaras et al. |
| 8,218,322 | B2 | 7/2012 | Clidaras et al. |
| 8,514,572 | B2 | 8/2013 | Rogers |
| 8,681,479 | B2 | 3/2014 | Englert |
| 8,707,095 | B2 * | 4/2014 | Grimshaw .......... G06F 11/2015 714/14 |
| 2006/0087122 | A1 | 4/2006 | Sheffield |
| 2007/0144079 | A1 | 6/2007 | Hourihan |
| 2008/0080104 | A1 * | 4/2008 | Yagudayev ............... H02J 3/40 361/20 |
| 2009/0058098 | A1 * | 3/2009 | Flynn ................. H05K 7/20745 290/1 R |
| 2009/0229194 | A1 | 9/2009 | Armillas |
| 2010/0290197 | A1 * | 11/2010 | Bergthold ............ H05K 7/1497 361/729 |
| 2010/0302744 | A1 * | 12/2010 | Englert ................ H05K 7/1457 361/730 |
| 2011/0023388 | A1 | 2/2011 | Tong et al. |
| 2011/0100618 | A1 * | 5/2011 | Carlson ............... F24F 11/0001 165/287 |
| 2011/0316337 | A1 * | 12/2011 | Pelio .................... H05K 7/1492 307/24 |
| 2012/0255710 | A1 | 10/2012 | Maselli et al. |
| 2013/0232888 | A1 | 9/2013 | Crosby, Jr. |
| 2013/0293017 | A1 | 11/2013 | Englert et al. |
| 2014/0099873 | A1 | 4/2014 | Ruiz et al. |

OTHER PUBLICATIONS

"HP Performance Optimized Datacenter" downloaded Feb. 26, 2013 from http://en.wikipedia.org/wiski/HP_Performance_Optimized_Datacenter&oldid=536557730, 4 pages.

"Sun Modular Datacenter", 4 pages. Copyright 2004-2009 Sun Microsystems, Inc.

Search Report and Written Opinion for International Application No. PCT/US2013/039329 mailed Sep. 6, 2013, 8 pages. International Searching Authority US, Alexandria Virginia US.

International Preliminary Report on Patentability for International Application No. PCT/US2013/039329 mailed Nov. 4, 2014, 6 pages. International Bureau of WIPO, Geneva, Switzerland.

Restriction Action for U.S. Appl. No. 13/792,948 mailed Nov. 5, 2013, 8 pages, U.S. Patent & Trademark Office, Alexandria VA US.

Non-Final Office Action for U.S. Appl. No. 13/792,948 mailed Jan. 27, 2014, 19 pages, U.S. Patent & Trademark Office, Alexandria VA US.

Notice of Allowance for U.S. Appl. No. 13/792,948 mailed Jun. 9, 2014, 6 pages, U.S. Patent & Trademark Office, Alexandria VA US.

* cited by examiner

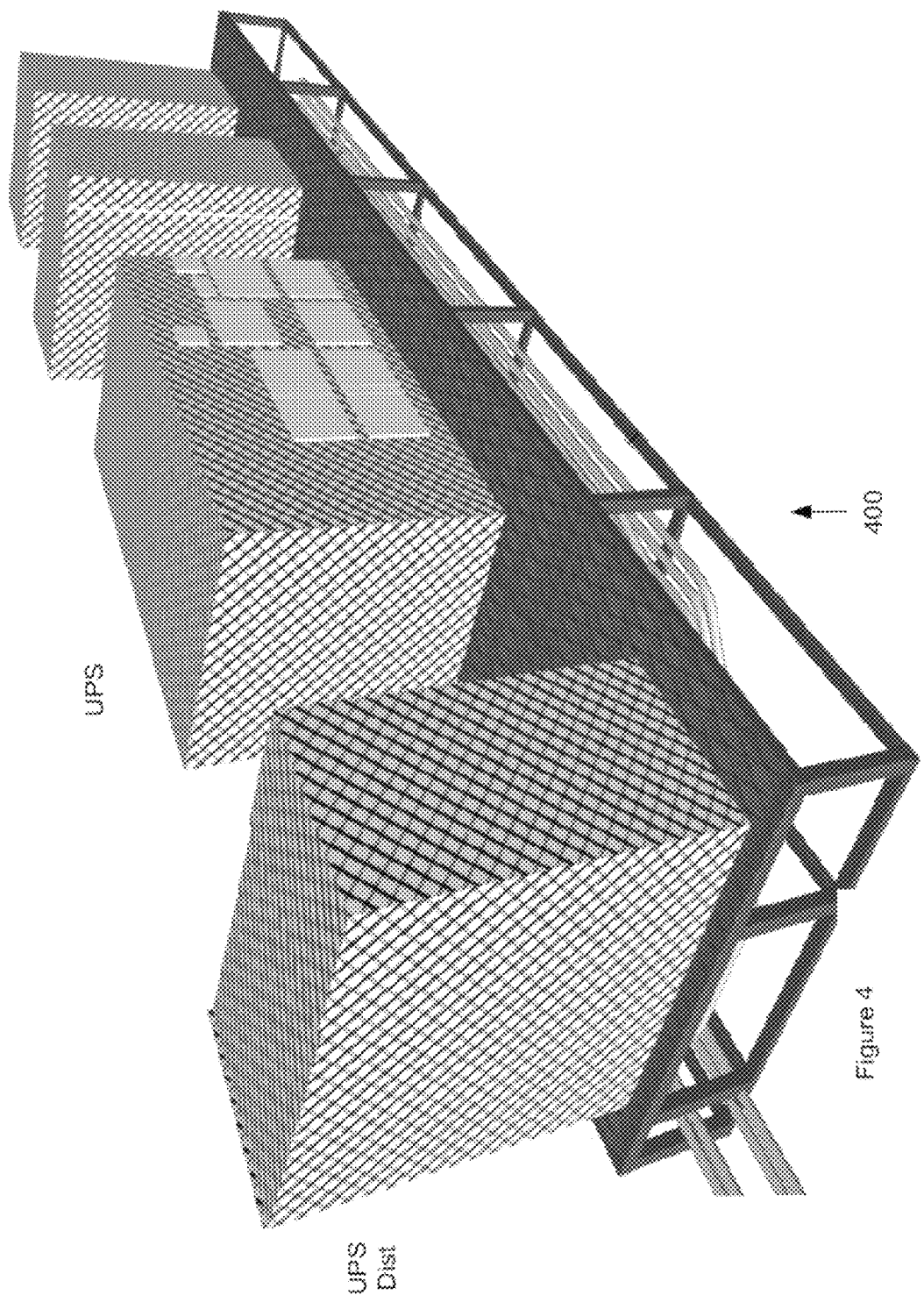

```
                            ┌──────┐
                            │ Cont.│
                            └──┬───┘
                               ▼
```

| where each power center contains its own modular-critical-power-distribution skid and is cooled by multiple packaged Heating, Ventilation, and Air Condition (HVAC) Roof-Top Units (RTU) providing at least N+1 system redundancy for the cooling system for each power center, where the electrical power for each HVAC roof-top unit is available from either the A-side power or B-side power from its own circuit breaker in the power distribution cabinets in each of the modular-critical-power-distribution skid, and in a failure event of a first HVAC RTU unit is detected by the environmental control system, the environmental control system ensures another HVAC RTU operates to supply cooling with enough capacity to meet the A-side power center and B-side power center electrical room full load 514                               requirements |

| the servers, storage devices, routers, and switches in the modular data center are cooled by a data hall set of two or more packaged HVAC roof top units. Electrical power for the data hall set of HVAC roof-top units is available from both the A-side power from a first circuit breaker in the power distribution cabinets in the first modular-critical-power-distribution skid and B-side power from a second circuit breaker in the power distribution cabinets in the second modular-critical-power-distribution skid via one or more automatic transfer switches. In a failure event of a first packaged HVAC RTU unit in the data hall set is detected by the environmental control system, then the environmental control system ensures another packaged HVAC RTU unit in the second set operates to supply cooling with enough capacity to meet the A-side power and B-side power electrical loads 516           in the modular data center full load requirements. |

| 518  the mechanical cooling system also has a hardened modular container |

| each wall section forming the first hardened building containing the first modular-critical-power-distribution skid and each wall section forming the second hardened building containing the second modular-critical-power-distribution skid has reinforced framework to meet Miami-Dade County standards to withstand up to 149 mph winds and a 1.5 seismic importance factor. The wall sections forming the hardened buildings are connected to a foundation. The first hardened building 520  bridges with a mechanical platform to the second hardened building. |

Figure 5B

```
                    ┌─Cont.─┐
                    └───┬───┘
                        ▼
``` two or more standby critical power generators connect to the first modular-critical-power-distribution skid, where each standby critical power generator electrically connects to one of the power distribution cabinets on its own corresponding modular-critical-power-distribution skid and then via a cross tie breaker of that skid to supply critical power to both the A-side and B-side, and where each standby critical power generator is installed outdoors in a weather protective enclosure
522 the uninterruptable power supply in each skid incorporates a valve-regulated lead-acid battery backup component configured to supply electrical loads in the modular data center for at least several minutes from that uninterruptable power
524                                      supply Each uninterruptable power supply has a dedicated external static bypass switch configured such that 1) when an inverter of the uninterruptable power supply failure is detected or 2) the battery of the uninterruptable power supply runs below a minimum threshold voltage, then the static bypass switch ensures the electrical load changes over automatically onto a mains AC electrical power input feed.
526 each modular-critical-power-distribution skid incorporates a modular fault tolerant control system. The uninterruptable power supply of each skid is configured to deliver continuous conditioned power to the electrical loads that are classified as critical in the modular data center. Each skid has interlocked circuit breakers in the power distribution cabinets to open and isolate circuit breakers electrically near a detected fault to isolate that fault from affecting a rest of the electrical loads
528                   in the modular data center facility the first modular-critical-power-distribution skid has a fully automated cross tie breaker inside its power distribution cabinets, where the automated cross tie breaker has a control system to cause for full electrical load transfers to be powered from either the first modular-critical-power-distribution skid or the second modular-critical-power-distribution skid while maintaining continuous uninterruptable power to the electrical loads classified as critical on both the A-side and the B-side in an event when a detector determines that one of the
530          modular-critical-power-distribution skids has failed.

Figure 5C                    End

ENVIRONMENTAL SYSTEM AND MODULAR POWER SKID FOR A FACILITY

RELATED APPLICATIONS

This application claims the benefit of and priority to U.S. Provisional Patent application Ser. No. 61/641,391, titled Environmental system and modular power skid for a facility, filed May 2, 2012, which is also incorporated herein by reference.

FIELD OF THE INVENTION

Embodiments of the invention generally relate to a pre-wired and pre-engineered integrated platform for power supply and distribution that is pre-assembled, scalable, and modular.

BACKGROUND OF THE INVENTION

Construction projects proceed in stages because certain aspects of the project must be completed prior to the next stage being initiated. However, the traditional stages of constructing a building can be altered with some creative thinking.

SUMMARY OF THE INVENTION

Various methods and apparatuses are described for a power distribution system. In an embodiment, a set of two or more modular-critical-power-distribution skids are arranged in a redundant power center configuration to supply power to electrical loads in a modular data center facility. A first modular-critical-power-distribution skid is housed in a first hardened building and connects to the electrical loads to supply power as an A-side power for the electrical loads. Likewise, a second modular-critical-power-distribution skid is housed in a second hardened building and connects to the electrical loads to supply power as a B-side power for the electrical loads. Each modular-critical-power-distribution skid is assembled with an uninterruptable power supply, multiple power distribution cabinets, and an environmental control system. Each modular-critical-power-distribution skid is pre-wired, pre-engineered, and pre-assembled for the uninterruptable power supply, the multiple power distribution cabinets, and the environmental control system in an off-site facility prior to being installed in the modular data center facility as a monolithic pre-assembled integrated platform. The uninterruptable power supply is electrically and mechanically connected into the multiple power distribution cabinets, all of which are mounted onto a steel framed support structure, which supports a weight of those uninterruptable power supplies and power distribution cabinets. The modular data center facility contains computing systems that includes servers and storage devices housed in hot and cool zones, routers and switches that transport data traffic between the servers as well as transport traffic to a world exterior to the modular data center facility. The environmental control system controls a cooling system for the modular-critical-power-distribution skids. Electrical power from the A-side and B-side connects in a redundant power configuration to electrical loads in the cooling system.

BRIEF DESCRIPTION OF THE DRAWINGS

The drawings refer to embodiments of the invention in which include many numbered and unnumbered figures such as:

FIG. 4 illustrates a diagram of an embodiment of a modular-critical-power-distribution skid assembled with an uninterruptable power supply, multiple power distribution cabinets, and an environmental control system.

FIGS. 5A-5C illustrate a flow chart of an embodiment of a method of supplying redundant power to electrical loads in a modular data center facility with a set of two or more modular-critical-power-distribution skids arranged in a redundant power supply configuration.

Figure 1:
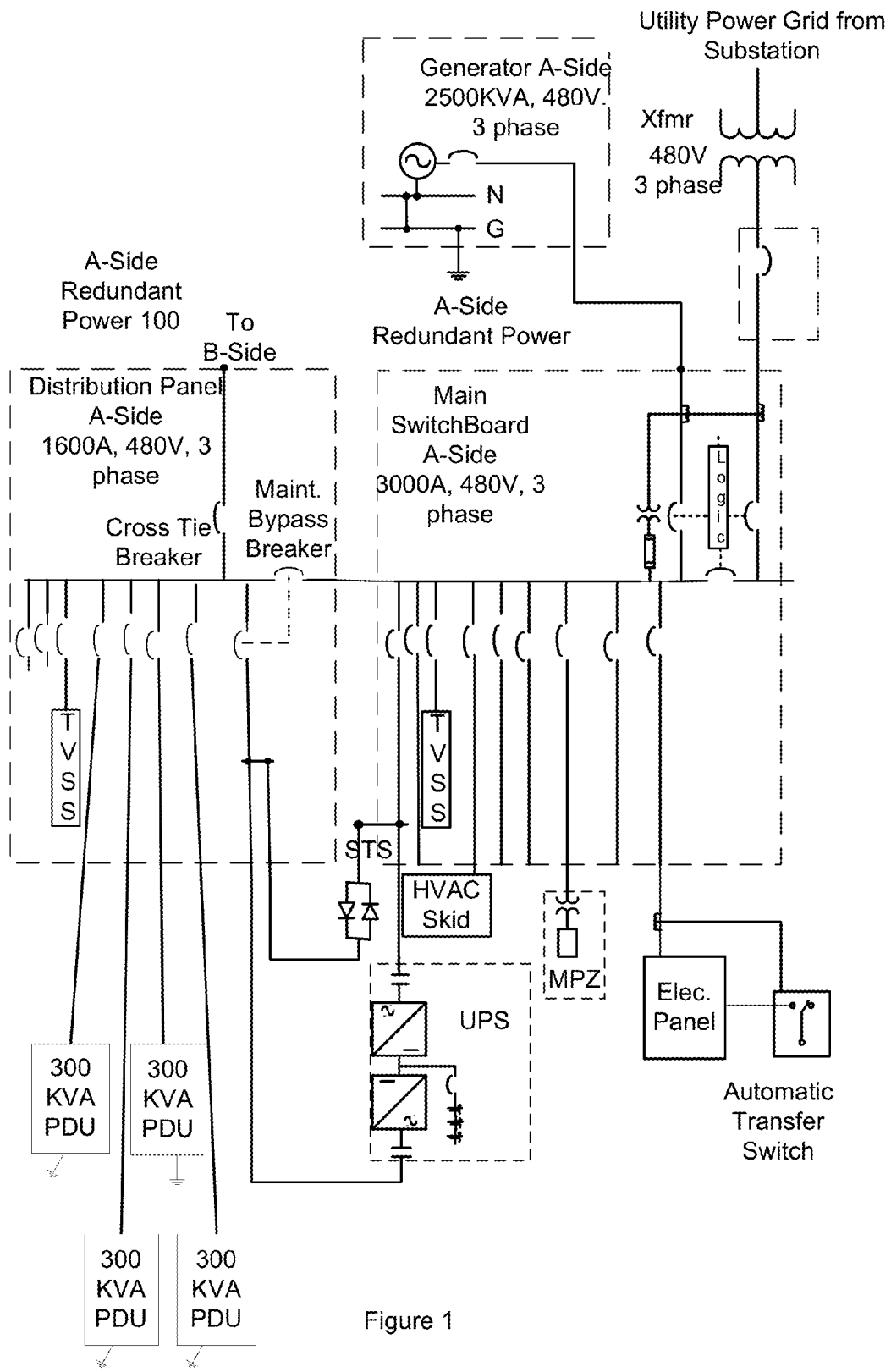
FIG. 1 illustrates an electrical schematic of an embodiment of the pre-wired and pre-engineered integrated platform for a modular power supply and distribution system for a modular data center facility.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, amount of emergency power supplies, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further, specific numeric references such as first enclosure, may be made. However, the specific numeric reference should not be interpreted as a literal sequential order but rather interpreted that the first enclosure is different than a second enclosure. Thus, the specific details set forth are merely exemplary. The specific details may be varied from and still be contemplated to be within the spirit and scope of the present invention.

In general, pre-wired and pre-engineered integrated platform for a set of two or more uninterruptable power supplies and power distribution that is pre-assembled, scalable, and modular is described. The concept includes modular units of a 1000 kW/1200 kW building with A/B Uninterruptible Power Supply system, switchgear, and environmental controls housed in modular container with a mechanical platform that bridges each A/B container system. The design provides a fully scalable and modular electrical infrastructure and mechanical cooling system without the need of a traditional "bricks-and-mortar" building. The environmental systems around the modular power skid along with the Uninterruptible Power Supply portion of the skid may be specifically engineered to work for a data center.

FIG. 1 illustrates an electrical schematic of an embodiment of the pre-wired and pre-engineered integrated platform for a modular power supply and distribution system in a modular data center facility. A set of two or more modular-critical-power-distribution skids are arranged in a redundant power center configuration to supply power to electrical loads in a modular data center facility. The A-side redundant power 100 is shown in FIG. 1 and the B-side redundant power would be similar. Also, in a redundant electrical power system, two independent feeds of power/two separate electrical cords go into that electrical component. A first modular-critical-power-distribution skid is housed in a first hardened building as a power center building and connects to the electrical loads to supply power as an A-side power for the electrical loads. Likewise, a second modular-critical-power-distribution skid is housed in a second hardened building and connects to the electrical loads to supply power as a B-side power for the electrical loads.

Two or more instances of the modular-critical-power-distribution skid, one or more emergency AC power diesel generators, and an amount of distinct and independent number of main power feed inputs from the utility power grid, all combine to make sure that power is supplied without interruption to the critical loads in the data center.

The Utility Power comes in through the center of the schematic diagram through a 2000/2500 kVA voltage step transformer and then through a 3000 amp circuit breaker. At least one or more of the modular-critical-power-distribution skids may include a direct electrical connection to a Utility Power grid voltage step down voltage transformer. The Utility Power grid voltage step down voltage transformer steps down the Utility Power grid voltage into a standard working voltage such as 480 Volts AC, which feeds into a main power supply input 3000 A circuit breaker located in a Main Switchboard on the skid. A tap power splitter could send Utility AC power directly to both the main/A-power side and redundant/B-power side. In an embodiment, the A-side power connects directly to the Utility Power and has a lug-only tie connection to a circuit breaker in the power center B-side. Each side, the main/A-side power and redundant/B-side power, has its own standby critical power source, such as a diesel generator connecting into that side. An electrical connection to a standby critical power source, such as a diesel generator, into a standby critical power supply 3000 A circuit breaker also located in the Main Switchboard of the skid. A set of logic for the skid is configured to select either the Utility Power grid-voltage power source or the standby critical power generator to supply AC electrical power to the uninterruptable power supply on each skid.

The power distribution cabinets may include a main switchboard and a set of Power Distribution Panels per skid. A series of circuit breakers are housed in the power distribution cabinets to provide fault protection to components in the cooling system and the electrical computing equipment loads. For example, the main switchboard on the A-side shows the circuit breakers going to the mechanical loads including the electrical power center's HVAC electrical loads, as well as its UPS. The universal power supply has a Static Bypass Switch and a battery backup power supply. A circuit breaker in the Main Switchboard may connect to one or more automatic transfer switches to supply electrical power for at least N+1 System cooling for the data center building's HVAC electrical loads. The Power Distribution Panels have circuit breakers going to a series of power distribution units, which each PDU has circuit breakers going to the critical power computing equipment loads in the data center on the left side of the UPS on the power distribution skid.

The B-side is set up similar to the A-side of this power supply and distribution scheme.

The uninterruptable power supply on each skid may incorporate a valve-regulated lead-acid battery backup component configured to supply electrical loads in the modular data center for at least several minutes from that uninterruptable power supply. Each uninterruptable power supply may have a dedicated external 2000 A ESBS with 1600 A primary feeder Static Bypass Switch (SSB). The Static Bypass Switch is configured that when 1) an inverter of the uninterruptable power supply failure is detected or 2) the battery of the uninterruptable power supply runs below a minimum threshold voltage (i.e. out of power), then the static bypass switch ensures the electrical load changes over automatically onto a mains AC electrical power input feed.

In an embodiment, the Main Switchgear has two 3000 A and two 1600 A UL-891 listed switchboards. The switchboards are equipped with five 3000 A circuit breakers, four 400 A circuit breakers, and four 450 A UL-489 listed circuit breakers. All circuit breakers larger than 200 A are 100% duty rated. All circuit breakers feature Zone Selective Interlocks (ZSI). ZSI ties the circuit breaker trip units together allowing them to communicate to ensure the circuit breaker closest to the fault trips first. Increasing the fault isolation capabilities increases the modular data center facilities ability to maintain operational continuity. The main switchboards can be configured as a main-tie-main-tie-main system. All switchboard controls can be accomplished via redundant, hot-synchronized Logic Controllers (LCs). Modbus protocol will be provided to the LC gateway for each main switchboard. The main switchgear may also have integrated revenue grade power quality metering.

In an embodiment, the UPS may be an ultra-energy efficient modular fault tolerant scalable UPS. The UPS delivers continuous conditioned power to the critical loads. The modular data center facility's power is configured as a 2N redundant system. In the event of a power failure either UPS can handle 100% of the critical load's 1.2 MW demand. The redundant UPSs provide for concurrent maintainability. Power to the two UPS systems is delivered from two separate (A/B) switchboards. Each switchboard is able to support the entire modular data center facility. Two tie circuit breakers operate in the normally closed position to allow redundancy from either skid. Each UPS system provides 1.2 MVA/1.2 MW of power output. The UPS features ultra-efficient Delta Conversion technology. The module efficiency varies from 96.3% at 50% load to 97% at full load. The UPS efficiency when lightly loaded is important. This is because under normal operations each UPS system is loaded at 50% or less of their full load capacity. Each UPS system may be supplied with a 5-minute, 8-cabinet, and Valve Regulated Lead Acid (VRLA) battery backup system with the low voltage cut off set at 1.70V/cell. Lug landings may be provided in UPS output cabinet for load bank connections.

The UPS power distribution may be configured as follows. The output of each UPS skid will be distributed through a 1600 amp distribution board. The switchboard is equipped with a maintenance bypass. A SKRU is provided to ensure the UPS has transferred to bypass before the maintenance bypass breaker can be engaged to the output switchboard. This will always be a closed transition transfer so that critical load power will never be lost. Additionally, the static bypass is part of the UPS internal circuitry and may be invoked manually using an external switch, and may synchronize the UPS output with the mains cycle before switching between the UPS and mains AC feed input.

Transient Voltage Surge Suppression (TVSS) is also provided at the main switchboards and at the UPS distribution power panels on the skid.

Power for the modular data center is provided by two or more redundant packaged power centers that house the skids. In an embodiment, each power center includes one or more 3000 A Main Switchboards, one or more 1.2 MW UPS Systems, a 1600 A Static Bypass Switch, a 5 minute battery backup at 1.2 MW, UPS Distribution Switchgear, and Automatic transfer switches for N+1 System cooling.

Figure 2:
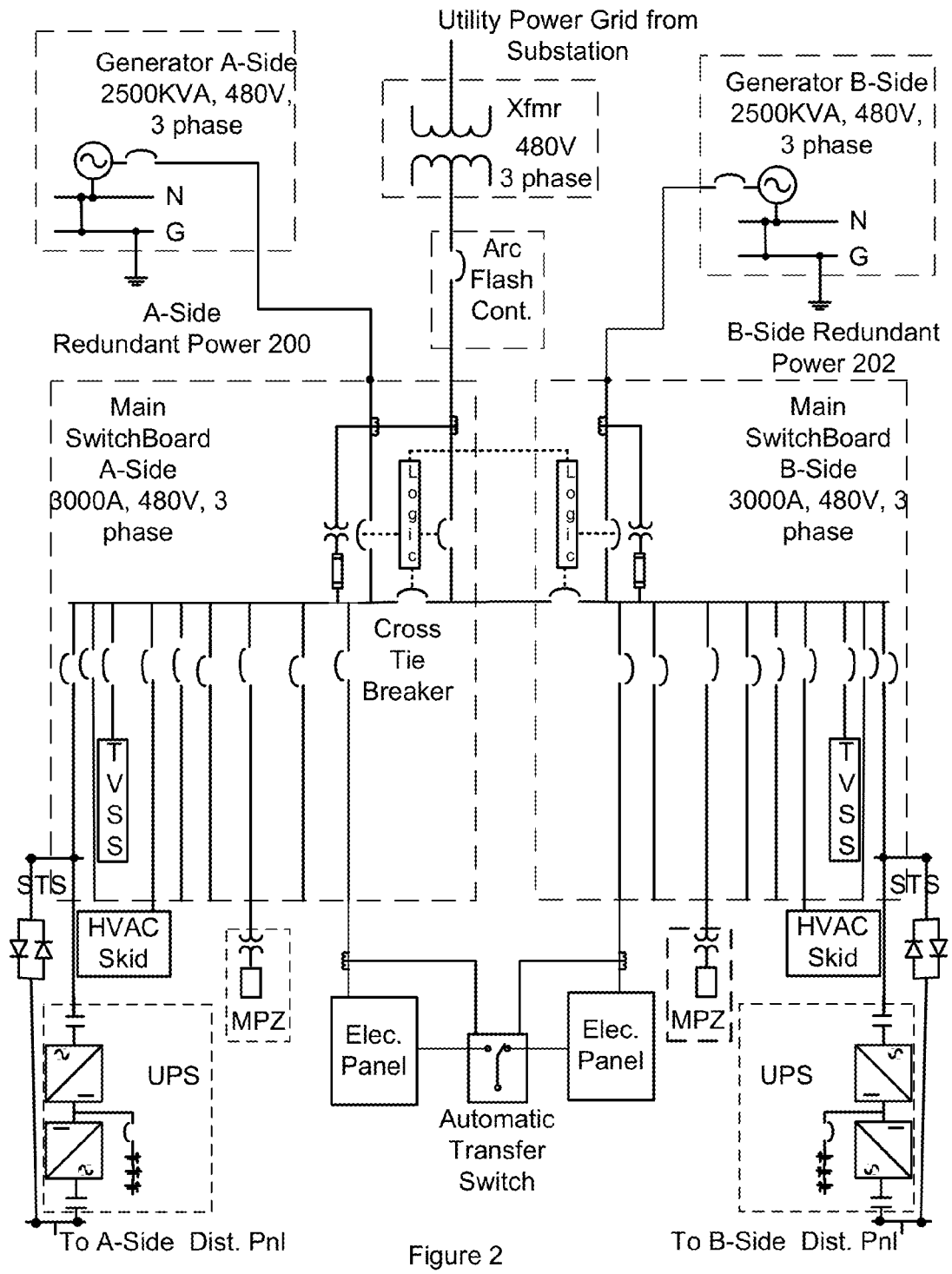
FIG. 2 illustrates an electrical schematic of an embodiment of a set of two or more modular-critical-power-distribution skids that are arranged in a redundant power center configuration to supply power to electrical loads in the modular data center facility with A-side power and B-side power.

FIG. 2 illustrates an electrical schematic of an embodiment of a set of two or more modular-critical-power-distribution skids that are arranged in a redundant power center configuration to supply power to electrical loads in a modular data center facility with A-side power 200 and B-side power 202. The input power from a Utility Power grid feed to the first modular-critical-power-distribution skid and the second modular-critical-power-distribution skid is delivered from two separate (A/B) switchboards. One switchboard comes from each modular-critical-power-distribution skid. The two modular-critical-power-distribution skids are electrically connected via a use of two cross tie circuit breakers (see FIGS. 2 and 3) housed in the power distribution cabinets that operate in the normally closed position.

Two or more standby critical power generators may connect to each modular-critical-power-distribution skid. Each standby critical power generator electrically connects to one of the power distribution cabinets on its own corresponding modular-critical-power-distribution skid and then via a cross tie breaker of that skid may be a standby critical power supply to both the A-side 200 and B-side 202. In an embodiment, the line side of the UPS where the utility AC power enters the power center has a cross tie circuit breaker that utilizes a tie circuit breaker in power center A. This allows for the switching of utility and generator from power center A-side 200 to power center B-side 202. The cross tie breaker has a control system to cause for full electrical load transfers to be powered from either the first modular-critical-power-distribution skid or the second modular-critical-power-distribution skid while maintaining continuous uninterruptable power to the electrical loads classified as critical on both the A-side 200 and the B-side 202 in an event when a detector determines that one of the modular-critical-power-distribution skids has failed. The critical load side of the UPS in the distribution power panel may have an automatic or a manually operated cross-tie that can be used to switch load from power center A-side 300 to power center B-side 302 to concurrently maintain both systems. (See FIG. 3)

Each standby critical power generator directly connects to its own modular-critical-power-distribution skid. Each standby critical power generator is installed outdoors in weather protective enclosure. Cam-lock connections may be provided within the generator enclosure to facilitate both portable load bank and portable generator connections. The modular data center facility standby critical power is provided by these one or more 2.0 MW/2.5 MVA, 277/480V, 3φ, 4 wire, Cummins power generators. Uptime Institute Tier 3 Certification for this generator requires the engine to be continuously rated for 1825 kW. The modular data center facility has the infrastructure to support a 2.0 MW swing generator that will provide N+1 generator redundancy. N+1 generator redundancy is required for Uptime Institute Tier 3 Certification. The sequence of operation of the total system is controlled automatically through deployment of redundant logic controllers control units installed in the 3000 A main switchboard. Should the primary critical power generator fail to come online after loss of the utility source, the optional swing critical power generator will pick up the critical loads of the system. Each generator will be provided with a weather protective enclosure. Generators can be equipped with a 4,000 gallon fuel storage belly tanks for 24 hours of fuel capacity at full load.

Each modular-critical-power-distribution skid incorporates a modular fault tolerant control system. Each uninterruptable power supply is configured to deliver continuous conditioned power to the electrical loads that are classified as critical in the modular data center. Each skid has interlocked circuit breakers in the power distribution cabinets to open and isolate circuit breakers electrically near a detected fault to isolate that fault from affecting the rest of the modular data center loads. In a failure event of the first modular-critical-power-distribution skid is detected by the fault tolerant control system, then the fault tolerant control system ensures the second modular-critical-power-distribution skid operates to supply electrical power with enough capacity to meet the A-side power center 200 and B-side power center 202 electrical loads in the modular data center full load requirements. The redundant modular-critical-power-distribution skids provide for concurrent maintainability for all cooling system electrical loads as well as those other electrical loads classified as critical in the modular data center.

The data center building has at least N+1 redundancy HVAC cooling supplied by its HVAC mechanical system electrically fed by the automatic transfer switches. The electrical power centers have 2N HVAC fed from each power center with no transfer switches but rather just a dedicated circuit breaker on each skid. There is also an A and B unit that are completely redundant fed into a common duct/plenum made to supply to either power center and regulated by motorized dampers.

The environmental control system electrically couples to one or more automatic transfer switches for an N+1 cooling system. Each automatic transfer switch connects to the main switchboard of each modular-critical-power-distribution skid.

In an embodiment, each data center can be supported by four 120-Ton Trane Intellipack roof-top units (RTU) providing N+1 system redundancy. Power for each RTU will be available from either the A-side skid or B-side skid through dedicated automatic transfer switches. The environmental control system cooperates with the Trane HVAC RTUs for integrated control that causes efficient airside economization across all units.

Each power center contains its own modular-critical-power-distribution skid and is cooled by multiple packaged Heating, Ventilation, and Air Condition (HVAC) Roof-Top Units (RTU), such as two (2) Trane 25-ton DX units, providing N+1 system redundancy for the cooling system for each power center. The HVAC units are oversized in cooling capacity so that one HVAC unit can supply the cooling needs of both electrical power centers. The electrical power for each HVAC roof-top unit is available from its associated A-side power 200 or B-side power 202 from its own circuit breaker in the power distribution cabinets in each of the modular-critical-power-distribution skids. In a failure event of one of the HVAC RTU units is detected by the environmental control system, then the environmental control system ensures another HVAC RTU operates to supply cooling with enough capacity to meet the A-side power center and B-side power center electrical room full load requirements. The environmental control system shifts the dampers for the ventilation system to supply cooling air for loads in both the A-side power center and B-side power center electrical room full load requirements.

The servers, storage devices, routers, and switches in the modular data center building are cooled by a data hall set of two or more packaged HVAC roof top units, such as four 120-Ton Trane Intellipack RTUs. Electrical power for the data hall cooling set of HVAC roof-top units is also available from both the A-side power from a first circuit breaker in the power distribution cabinets in the first modular-critical-power-distribution skid and B-side power from a second circuit breaker in the power distribution cabinets in the second modular-critical-power-distribution skid via one or more automatic transfer switches. In a failure event of one of the data hall cooling HVAC RTU units in this set is detected by the environmental control system, then the environmental control system ensures another data hall cooling HVAC RTU unit in this set operates to supply cooling with enough capacity to meet the A-side power and B-side power electrical loads in the modular data center full load requirements. The environmental control system shifts the dampers for the ventilation system to supply cooling air for loads in both the A-side power center and B-side power center data hall cooling full load requirements.

In an embodiment, cooling for the data hall pod is provided by four (4) Trane 120-ton DX air handlers with fresh air economization and integrated controls configured. Cooling for the PPOP in the modular data center facility is provided by a Trane 1½ ton package AC unit. Cooling for the remainder of the Structure is provided by a Trane 20 ton package VAV unit. A Support building of the modular data center facility may also be cooled by the Trane 20 ton package VAV unit. Cooling for each of the Electrical Power Centers of the modular data center facility may be provided by two (2) Trane 25-ton DX units with fresh air economization and integrated controls configured and over sized in capacity to cool both Electrical Power Centers. The environmental control system cooperates with any controls integrated into the units.

In an embodiment, the data floor pod building of the modular data center facility has its mechanical cooling system and electrical power to the mechanical cooling system arranged as an N+1 Redundancy. Under full load normal conditions, each HVAC unit in the mechanical cooling system operates at 75% capacity. In the event one unit fails, the three remaining units have sufficient capacity to meet the data room full load requirements. Cooling capacity is suited for 1 MW load on 20 year extreme dry bulb/extreme wet bulb day or 1.2 MW load when supply temperature is 75 degrees and containment is implemented.

In an embodiment, the electrical power center building of the modular data center facility has its mechanical cooling system and electrical power to the mechanical cooling system arranged as a 2N Mechanical Redundancy. Under full load normal conditions, one of the two 25 nominal tons package HVAC DX unit can provide the full cooling load. In the event one unit fails, the one remaining unit has sufficient capacity to meet the electrical room full load requirements.

The data hall structure area of the modular data center facility will have redundant individually metered 225 A 480V and a 225 A 120/208V dedicated panel boards. The house and PPOP power of the modular data center facility will have redundant individually metered 100 A 120/208V Voltage Panels. One Voltage Panel will be fed from the A-side system electrical power and a second Voltage Panel from the B-side system electrical power. The Support building module of the modular data center facility can also be fed from data hall structure A and B panel boards through dedicated automatic transfer switches (ATS).

Figure 3:
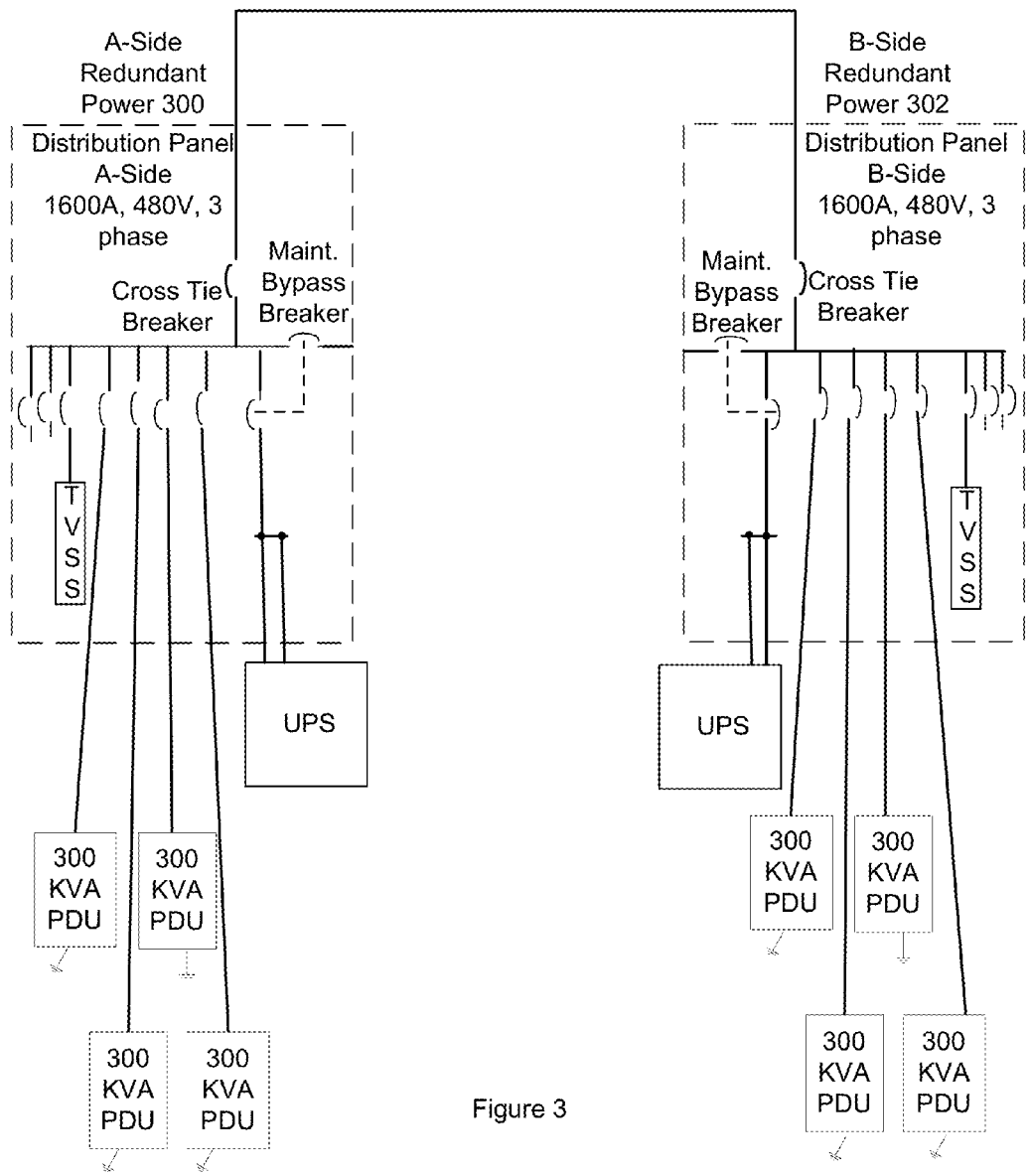
FIG. 3 illustrates an electrical schematic of an embodiment of a set of two or more modular-critical-power-distribution skids that connect via a cross tie breaker in each skid's Power Distribution Panel.

FIG. 3 illustrates an electrical schematic of an embodiment of a set of two or more modular-critical-power-distribution skids that connect via a cross tie breaker in each skid's Power Distribution Panel. Each modular-critical-power-distribution skid has a cross tie breaker inside its power distribution cabinets.

An electrical power output of each uninterruptable power supply is distributed through its own 1600 A distribution switchboard in the power distribution cabinets. The distribution switchboard is equipped with a maintenance bypass breaker with control logic to ensure the uninterruptable power supply has transferred to bypass before the maintenance bypass breaker can be engaged to an output of the distribution switchboard. The control logic ensures that this will always be a closed transition transfer so that electrical power to the electrical loads classified as critical will never be lost.

Additionally, multiple power distribution units, such as four –300 kVA PDUs, per modular power skid are electrically connected to the uninterruptable power supply of that skid via one or more circuit breakers in the power distribution panels mounted on the framed support structure of the skid. The multiple power distribution units are electrically connected in an alternating A-side power/B-side power arrangement in a data hall to provide electrical 208/120V power to the electrical loads classified as critical via either an 1) overhead bus way or a 2) Remote Power Panel (RPP). Each power distribution unit has a 300 kVA K-13 rated step down transformer to convert a supplied input 480 Volts AC into an outputted lower 120 Volts AC, and multiple circuit breakers, such as six 225 A breakers. Each power distribution unit may also have six integrated revenue grade power monitoring meters. Thus, each power distribution units may have a paired circuit breaker and power monitoring meter going to the critical power computing equipment loads in the data center. Each individual power distribution unit feeds electrical power to a portion of the critical electrical power loads in the modular data center. In an embodiment, the eight 300 kVA PDUs are installed in an alternating A/B arrangement in the data hall to provide 208/120V power to either overhead bus way or Remote Power Panels (RPP).

FIG. 4 illustrates a diagram of an embodiment of a modular-critical-power-distribution skid assembled with an uninterruptable power supply, multiple power distribution cabinets, and an environmental control system. Each modular-critical-power-distribution skid 400 is pre-wired, pre-engineered, and pre-assembled for the uninterruptable power supply, the multiple power distribution cabinets, and the environmental control system in an off-site facility prior to being installed in the modular data center facility as a monolithic pre-assembled integrated platform. The uninterruptable power supply is electrically and mechanically connected into the multiple power distribution cabinets, all of which are mounted onto a steel framed support structure, which supports a weight of those uninterruptable power supplies and power distribution cabinets. The modular data center facility contains computing systems that includes servers and storage devices housed in hot and cool zones, routers and switches that transport data traffic between the servers as well as transport traffic to a world exterior to the modular data center facility. The environmental control system controls a cooling system for the modular-critical-power-distribution skids. Electrical power from the A-side and B-side connects in a redundant power configuration to electrical loads in the cooling system.

Each wall section forming the first hardened building containing the first modular-critical-power-distribution skid and each wall section forming the second hardened building containing the second modular-critical-power-distribution skid has reinforced framework to meet Miami-Dade County standards to withstand up to 149 mph winds and a 1.5 seismic importance factor. The wall sections forming the hardened buildings may be fitted together in a tongue and groove fashion and are connected to a foundation. The electrical power centers are IBC rated R17 structures that meet Miami-Dade County 149 mph wind pressure loading requirements. The electrical power centers are constructed to provide protection with respect to harmful effects on the equipment due to the ingress of water (rain, sleet, snow); and that will be undamaged by the external formation of ice on the enclosure. Each wall section forming the shell is prefabricated and shipped to the parcel of land to be installed as part of the hardened-structure building module.

In an embodiment, the power module and its environmental systems are in a hardened enclosed, such as in an insulated IBC rated structure capable of withstanding a 149 mph wind rating at a 1.5 Seismic Importance Factor, along with a field certification by Underwriters Laboratories (UL). The electrical power center is attached to the pad. For example, the electrical power center is coupled to the building structure and anchored to an equipment pad. The electrical power center couples mechanically and electrically to the data center structure, which allows the end user to have unimpaired walking access via a corridor between the electrical power center and the data center structure.

The mechanical cooling system also has a hardened modular container.

The hardened buildings can bridge with a mechanical platform to the other hardened buildings. Also, each standby critical power generator is installed outdoors in a weather protective enclosure.

The environmental systems around the modular power skid along with the Uninterruptible Power Supply portion of the skid functions generally like a traditional electrical room. The electrical power distribution system helps eliminate the variables that inevitably affect traditional construction. We can manufacture this product in a controlled environment and deliver it anywhere in the world. The environmental systems around the modular power skid along with the Uninterruptible Power Supply portion of the skid can be used in a parking lot, attached to an existing or new building, on a 50-story roof, really anywhere it may ever be needed.

In the Data Center business, time is critical. An ability to deliver the environmental systems around the modular power skid along with the Uninterruptible Power Supply portion of the skid on or ahead of schedule sometimes outweighs any other variable. The environmental systems around the modular power skid along with the Uninterruptible Power Supply portion of the skid allow us to accelerate the overall schedule and provide a fast and attainable delivery to the end user. Another major driving factor is consistency of the environmental systems around the modular power skid along with the Uninterruptible Power Supply portion of the skid. Assembling the environmental systems around the modular power skid along with the Uninterruptible Power Supply portion of the skid in the factory opposed to on site, alleviates some of the concerns associated with traditional construction. Coordination with other trades and construction groups, weather, and other typical site delays have no bearing on the manufacturing of the environmental systems around the modular power skid along with the Uninterruptible Power Supply portion of the skid. The delivery is coordinated up front and can be maintained and accommodated similar to any other manufactured product. Lastly is cost. Budget information thus far for the environmental systems around the modular power skid along with the Uninterruptible Power Supply portion of the skid shows that the fabrication and delivery costs less money than traditional methods. This electrical power center design combines a lower cost/kW and the predictability and consistency of the product it provides for a higher level of predictability and reliability, which is the foundation of all Data Center development.

The environmental systems around the modular power skid along with the Uninterruptible Power Supply portion of the skid allows reduced construction costs and accelerates the overall construction schedule. This provides for a faster delivery and construction of a functional data center that directly equates to a quicker revenue chain for the customer. The environmental systems around the modular power skid along with the Uninterruptible Power Supply portion of the skid is fabricated and assembled off-site in a controlled environment. This decreases the risks associated for all parties and provides an extremely consistent and reliable product. The environmental systems around the modular power skid along with the Uninterruptible Power Supply portion of the skid also requires a much smaller footprint than traditional electrical rooms and associated cooling rooms allowing the end user to reclaim valuable real estate. That real estate can be turned into additional leasable space or used to decrease the footprint of the building thus reducing overall project costs and offering schedule reductions.

Next, an initial set of building modules can be built upon a parcel of land to form a modular data center facility, and then as needs of space and additional capacity of the modular datacenter facility increase, then at a future point in time an additional pre-engineered data hall as well as power center containing its redundant set of modular-critical-power-distribution skids to supply A-side and B-side power and cooling for the electrical loads of the data hall and power center can be rapidly added to the initial set of building modules to form an integrated modular data center facility. Thus, the integrated data center facility transformation takes a step-by-step approach carried out over time through an addition of more building modules added to existing building modules.

The modular datacenter facility features a shell that hardens a 1.2 MW datacenter and optional support space areas. The modular datacenter facility design provides for complete customer separation. Each modular datacenter facility is a fully self-contained facility that includes building structures including the data center pod building and electrical power centers.

The data center pod building housing 10,000 SF raised floor area to house the computing equipment within the datacenter, in a Tier 3 rated datacenter.

The Seismic Criteria for the modular data center facility may be based on SMACNA Seismic Restraint Manual Guidelines for Mechanical Systems, 2nd Edition, 1998; Seismic Hazard Level "A", Connection Level 1. All calculations will be performed with an importance factor of 1.5. Vibration isolated equipment will be seismically braced using loose cables, telescoping pipes or box sections, angles or flat plates used as limit stops or snubbers, either integral to or separate from the isolators. Non-rotating, fixed equipment will be bolted directly to the floor or structure. Rectangular ductwork with a cross-sectional area greater than 6 square feet and round ductwork with a diameter of at least 28 inches will be restrained, unless suspended by hangers within 12 inches of the supporting structure. The following vibration control principles will be consistent with ASHRAE guidelines (2003 HVAC Applications Handbook, Chapter 47) and industry standard practices.

The HVAC System may have the following systems and equipment. The Air Conditioning system and equipment may be as follows.

The Data Center Room system may consist of four 120 nominal ton Trane DX down flow Air Conditioner units. Three units are required to meet load and fourth unit will give N+1 redundancy. Each AC unit will be ducted to common plenum walls. Plenums will convey air to room raised-floor with floor distribution grilles (layout by others). One Electric Steam Humidifier (HU-1), Neptronic will be installed on Air Handler unit. The Air Handler unit will recirculate plenum air and convey required moisture to datacenter via HU-1 dispersion tubes. The Rooftop packaged AC units with greater than 30 nominal tons will be mounted on external 2 inch seismic spring isolators.

The Electrical Power Center Rooms may consist of two 25 nominal ton Trane DX cooling-only down flow AC units with one unit redundant. Those units will be ducted to main common distribution duct. One 500 cubic feet per minute exhaust fan will be installed on each electrical room. Each container will be provided with one relief vent. The Rooftop packaged AC units with greater than 25 nominal tons may be mounted on external 2 inch seismic spring isolators.

The skeletal framework of the integrated platform acts as an equipment support structure as well as a cable routing support system. The integrated platform supports the weight of two or more cabinet enclosures and one or more Uninterruptable Power Supplies mounted onto the skeletal framework that includes a main power supply input breakers housed in a first cabinet enclosure mounted to the skeletal framework, and a power distribution output to datacenter loads housed in a second cabinet enclosure mounted to the skeletal framework. The power supply wiring can be laid out and routed along the skeletal framework of the integrated platform integrated platform to and between the one or more of the cabinet enclosures mounted onto the skeletal framework and the one or more Uninterruptable Power Supplies mounted onto the skeletal framework. The skeletal framework of the integrated platform has top and bottom rails run substantially parallel to each other with cross bars connecting the top and bottom rails to form the skeletal framework of the integrated platform. The skeletal framework has a top horizontal surface to which one or more of the cabinet enclosures mount to those rails making up the top horizontal surface of the skeletal framework.

The Uptime Institutes Datacenter Tier ratings scenarios include 1) a Tier I N redundant rating; 2) Tier II 2N redundant critical components rating; 3) a Tier III 2N redundant concurrently maintainable rating; and 4) a Tier IV 2N redundant, concurrently maintainable, fault tolerant rating.

The pre-designed and manufactured electrical power center provides a fully scalable and modular electrical infrastructure and mechanical cooling system. This allows a dedicated data center built in any location that you want. The permanent structure would be Uptime Tier III certified, LEED Gold compliant and hardened against wind and seismic threats. The facility is modular in 1.2 MW increments and can be expanded on the same site. Each module has 10,000 square feet of column-free raised floor space supporting rack densities of up to 30 kW. Data center halls can be dedicated to a single customer, and meets Uptime tier III requirements with a hardened building that can expand in 1.2 MW increments on the same site. The pre-designed and manufactured electrical power center gives the ability to grow, to plan for growth, and to provide flexibility to meet any company's needs.

The 2N Redundancy protection connects each power supply going to a component to its own UPS. This provides double protection from both a power supply failure and a UPS failure, so that continued operation is assured. Note, "N+1" means that if the load can be supplied by N power sources/cooling sources, etc., the installation will contain N+1 power sources/cooling sources, etc. In this way, failure of one power source/cooling source will not impact system operation.

Figure 5A:
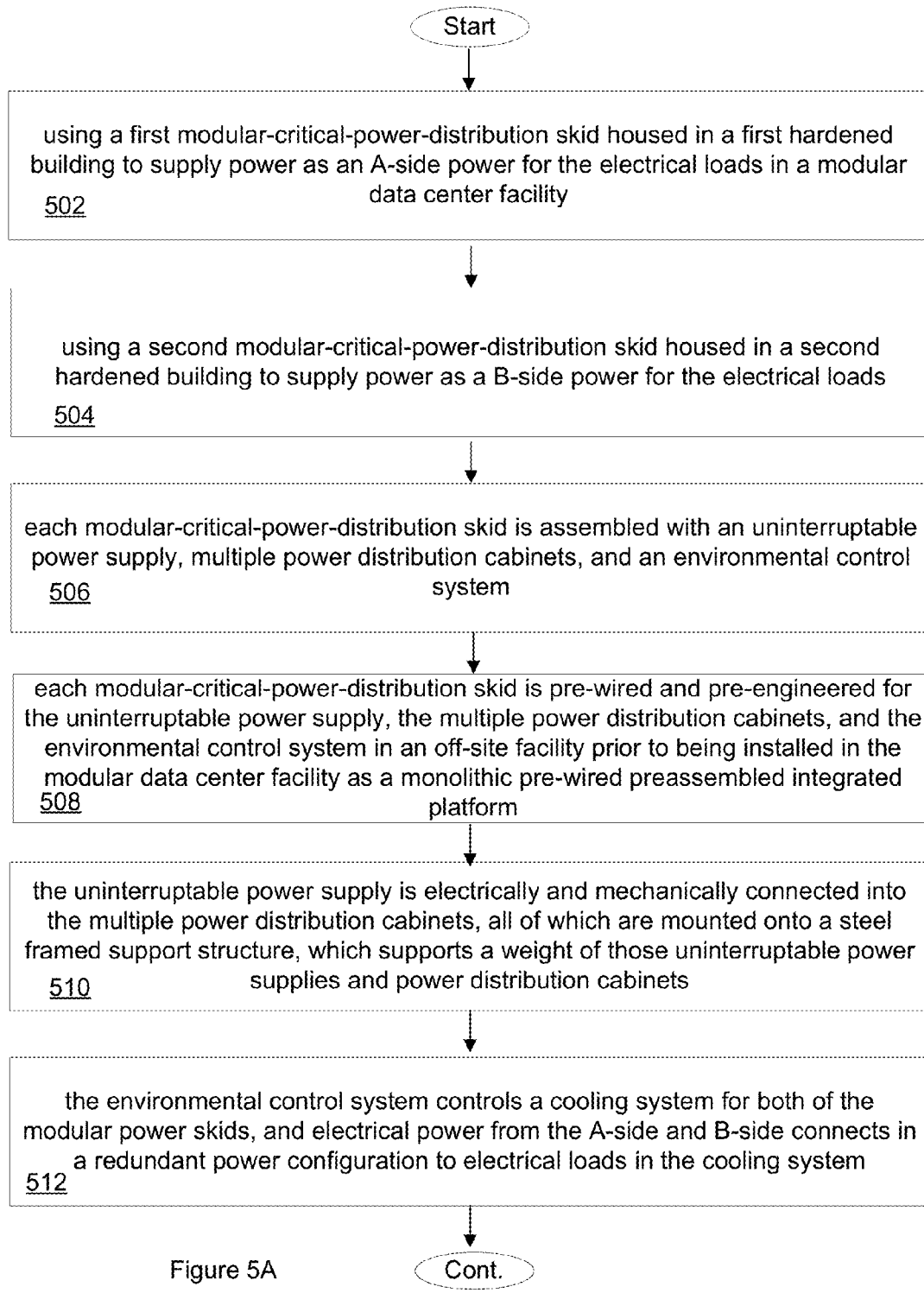

FIGS. 5A-5C illustrate a flow chart of an embodiment of a method of supplying redundant power to electrical loads in a modular data center facility with a set of two or more modular-critical-power-distribution skids arranged in a redundant power supply configuration. The following is an example method of supplying redundant power to electrical loads in a modular data center facility with a set of two or more modular-critical-power-distribution skids arranged in a redundant power supply configuration.

In step 502, the method uses a first modular-critical-power-distribution skid housed in a first hardened building to supply power as an A-side power for the electrical loads.

In step 504, the method uses a second modular-critical-power-distribution skid housed in a second hardened building to supply power as a B-side power for the electrical loads.

In step 506, the method uses two or more modular-critical-power-distribution skids that are assembled with an uninterruptable power supply, multiple power distribution cabinets, and an environmental control system.

In step 508, the method uses a modular-critical-power-distribution skid that is pre-wired and pre-engineered for the uninterruptable power supply, the multiple power distribution cabinets, and the environmental control system in an off-site facility prior to being installed in the modular data center facility as a monolithic pre-wired preassembled integrated platform.

In step 510, the uninterruptable power supply is electrically and mechanically connected into the multiple power distribution cabinets, all of which are mounted onto a steel framed support structure, which supports a weight of those uninterruptable power supplies and power distribution cabinets.

In step 512, the environmental control system controls a cooling system for both of the modular power skids, and electrical power from the A-side and B-side connects in a redundant power configuration to electrical loads in the cooling system.

In step 514, the method uses two or more power center contains, which each has its own modular-critical-power-distribution skid and is cooled by multiple packaged Heating, Ventilation, and Air Condition (HVAC) Roof-Top Units (RTU) providing at least N+1 system redundancy for the cooling system for each power center. The electrical power for each HVAC roof-top unit is available from either the A-side power or B-side power from its own circuit breaker in the power distribution cabinets in each of the modular-critical-power-distribution skid, and in a failure event of a first HVAC RTU unit is detected by the environmental control system, the environmental control system ensures another HVAC RTU operates to supply cooling with enough capacity to meet the A-side power center and B-side power center electrical room full load requirements.

In step 516, the method has servers, storage devices, routers, and switches in the modular data center that are cooled by a data hall set of two or more packaged HVAC roof top units. Electrical power for the data hall set of HVAC roof-top units is available from both the A-side power from a first circuit breaker in the power distribution cabinets in the first modular-critical-power-distribution skid and B-side power from a second circuit breaker in the power distribution cabinets in the second modular-critical-power-distribution skid via one or more automatic transfer switches. In a failure event of a first packaged HVAC RTU unit in the data hall set is detected by the environmental control system, then the environmental control system ensures another packaged HVAC RTU unit in the second set operates to supply cooling with enough capacity to meet the A-side power and B-side power electrical loads in the modular data center full load requirements.

In step 518, the mechanical cooling system also has a hardened modular container.

In step 520, each wall section forming the first hardened building containing the first modular-critical-power-distribution skid and each wall section forming the second hardened building containing the second modular-critical-power-distribution skid has reinforced framework to meet Miami-Dade County standards to withstand up to 149 mph winds and a 1.5 seismic importance factor. The wall sections forming the hardened buildings are connected to a foundation. The first hardened building bridges with a mechanical platform to the second hardened building.

In step 522, two or more standby critical power generators connect to the first modular-critical-power-distribution skid. Each standby critical power generator electrically connects to one of the power distribution cabinets on its own corresponding modular-critical-power-distribution skid and then via a cross tie breaker of that skid to supply critical power to both the A-side and B-side. Each standby critical power generator is installed outdoors in a weather protective enclosure.

In step 524, the uninterruptable power supply in each skid incorporates a valve-regulated lead-acid battery backup component configured to supply electrical loads in the modular data center for at least several minutes, such as 5-7 minutes, from that uninterruptable power supply at for example a 1.2 Megawatt electrical load.

In step 526, each uninterruptable power supply has a dedicated external static bypass switch configured such that 1) when an inverter of the uninterruptable power supply failure is detected or 2) the battery of the uninterruptable power supply runs below a minimum threshold voltage, then the static bypass switch ensures the electrical load changes over automatically onto a mains AC electrical power input feed.

In step 528, each modular-critical-power-distribution skid incorporates a modular fault tolerant control system. The uninterruptable power supply of each skid is configured to deliver continuous conditioned power to the electrical loads that are classified as critical in the modular data center. Each skid has interlocked circuit breakers in the power distribution cabinets to open and isolate circuit breakers electrically near a detected fault to isolate that fault from affecting a rest of the electrical loads in the modular data center facility. In a failure event of the first modular-critical-power-distribution skid is detected by the fault tolerant control system, then the fault tolerant control system ensures the second modular-critical-power-distribution skid operates to supply electrical power with enough capacity to meet the A-side power center and B-side power center electrical loads in the modular data center full load requirements. The redundant modular-critical-power-distribution skids provide for concurrent maintainability for all cooling system electrical loads as well as those other electrical loads classified as critical in the modular data center facility. Input power from a Utility Power grid feed to the first modular-critical-power-distribution skid and the second modular-critical-power-distribution skid is delivered from two separate switchboards, where one switchboard comes from each modular-critical-power-distribution skid. The two modular-critical-power-distribution skids are electrically connected via a use of two cross tie circuit breakers housed in the power distribution cabinets that operate in the normally closed position.

In step 530, the first modular-critical-power-distribution skid has a cross tie breaker inside its power distribution cabinets. The cross tie breaker has a control system to cause for full electrical load transfers to be powered from either the first modular-critical-power-distribution skid or the second modular-critical-power-distribution skid while maintaining continuous uninterruptable power to the electrical loads classified as critical on both the A-side and the B-side in an event when a detector determines that one of the modular-critical-power-distribution skids has failed.

While some specific embodiments of the invention have been shown, the invention is not to be limited to these embodiments. For example, most functions performed by electronic hardware components may be duplicated by software emulation. Thus, a software program written to accomplish those same functions may emulate the functionality of the hardware components in input-output circuitry. The type of cabinets may vary, etc. The invention is to be understood as not limited by the specific embodiments described herein, but only by scope of the appended claims.

We claim:

1. A power distribution system, comprising:
a set of two or more modular-critical-power-distribution skids are arranged in a redundant power center configuration to supply power to electrical loads in a modular data center facility,
where a first modular-critical-power-distribution skid is housed in a first hardened building and connects to the electrical loads to supply power as an A-side power for the electrical loads, and
where a second modular-critical-power-distribution skid is housed in a second hardened building and connects to the electrical loads to supply power as a B-side power for the electrical loads,
where each modular-critical-power-distribution skid is assembled with an uninterruptable power supply, multiple power distribution cabinets, and an environmental control system,
where each modular-critical-power-distribution skid is pre-wired and pre-engineered for the uninterruptable power supply, the multiple power distribution cabinets, and the environmental control system in an off-site facility prior to being installed in the modular data center facility as a monolithic pre-wired preassembled integrated platform, and
where the uninterruptable power supply is electrically and mechanically connected into the multiple power distribution cabinets, all of which are mounted onto a steel-framed support structure, which supports a weight of those uninterruptable power supplies and power distribution cabinets,
where the modular data center facility contains computing systems that includes servers and storage devices housed in hot and cool zones, routers and switches that transport data traffic between the servers as well as transport the data traffic to a world exterior to the modular data center facility,
where the environmental control system controls a cooling system for the set of the two or more modular-critical-power-distribution skids, and electrical power from the A-side power and the B-side power connects in a redundant power configuration to electrical loads in the cooling system,
where each power center of the redundant power center configuration contains its own modular-critical-power-distribution skid and is cooled by multiple packaged Heating, Ventilation, and Air Condition (HVAC) Roof-Top Units (RTU) providing at least N+1 system redundancy for the cooling system for each power center, where electrical power for each HVAC roof-top unit that cools the power centers is available from both the A-side power from its own circuit breaker in the power distribution cabinets in the first modular-critical-power-distribution skid and the B-side power from its own circuit breaker in the power distribution cabinets in the second modular-critical-power-distribution skid, and where each modular-critical-power-distribution skid has a cross tie breaker inside its power distribution cabinets to allow at least the first modular-critical-power-distribution skid to supply both the A-side power and the B-side power in the redundant power configuration when the cross tie breaker is closed and the first modular-critical-power-distribution skid is operational.

2. The system of claim 1,
where the environmental control system electrically couples to one or more automatic transfer switches for the N+1-redundant cooling system, and in a failure event of a first HVAC RTU that cools the power centers is detected by the environmental control system, then the environmental control system ensures enough HVAC RTUs operate to supply cooling with enough capacity to meet the A-side power and the B-side power electrical loads in accordance with modular data center facility room full-load requirements.

3. The system of claim 2,
where the servers, storage devices, routers, and switches in the modular data center facility are cooled by a second set of two or more packaged HVAC roof top units that cools modular data center facility electrical loads, where electrical power for the second set of HVAC roof-top units is available from both the A-side power from a first circuit breaker in the power distribution cabinets in the first modular-critical-power-distribution skid and the B-side power from a second circuit breaker in the power distribution cabinets in the second modular-critical-power-distribution skid via one or more automatic transfer switches, and in a failure event of a first packaged HVAC RTU in the second set of packaged HVAC roof top units that cools the modular data center facility electrical loads is detected by the environmental control system, then the environmental control system ensures another packaged HVAC RTU in the second set of packaged HVAC roof top units operates to supply cooling with enough capacity to meet the A-side power and the B-side power electrical loads in accordance with the modular data center facility full-load requirements.

4. The system of claim 2, where the uninterruptable power supply for each skid incorporates a valve-regulated lead-acid battery backup component configured to supply electrical loads in the modular data center facility for at least several minutes from that uninterruptable power supply, and each uninterruptable power supply has a dedicated external static bypass switch configured such that 1) when an inverter of the uninterruptable power supply detects failure or 2) the battery backup component of the uninterruptable power supply runs below a minimum threshold voltage, then the static bypass switch ensures an electrical load changes over automatically onto a main AC electrical power input feed.

5. The system of claim 2,
where an initial set of building modules can be built upon a parcel of land to form the modular data center facility, and then as needs of space and additional capacity of the modular data center facility increase, then at a future point in time an additional pre-engineered data hall as well as a power center containing a redundant set of modular-critical-power-distribution skids to supply the A-side power and the B-side power and cooling for electrical loads of the data hall and the power center can be rapidly added to the initial set of building modules to form an integrated modular data center facility; and thus, the integrated data center facility transformation takes a step-by-step approach carried out over time through an addition of more building modules added to the initial set of building modules.

6. The system of claim 1,
where wall sections forming the first hardened building containing the first modular-critical-power-distribution skid and wall sections forming the second hardened building containing the second modular-critical-power-distribution skid have reinforced frameworks to meet Miami-Dade County standards to withstand up to 149 mph winds and a 1.5 seismic importance factor, and where the wall sections forming the hardened buildings are connected to a foundation.

7. The system of claim 6,
where the cooling system is mechanical and also has a hardened modular container; and where the first hardened building bridges with a mechanical platform to the second hardened building, and two or more standby critical power generators connect to the first modular-critical-power-distribution skid, where each standby critical power generator electrically connects to one of the power distribution cabinets on its own corresponding modular-critical-power-distribution skid and then via the cross tie breaker of that skid to supply critical power to both the A-side power and the B-side power, and where each standby critical power generator is installed outdoors in a weather protective enclosure.

8. The system of claim 1, where each modular-critical-power-distribution skid incorporates a modular fault tolerant control system, where the uninterruptable power supply of each skid is configured to deliver continuous conditioned power to the electrical loads that are classified as critical in the modular data center facility and each skid has interlocked circuit breakers in the power distribution cabinets to open and isolate the circuit breakers electrically near a detected fault to isolate that fault from affecting a rest of the electrical loads in the modular data center facility, where in a failure event of the first modular-critical-power-distribution skid is detected by the fault tolerant control system, then the fault tolerant control system ensures the second modular-critical-power-distribution skid operates to supply electrical power with enough capacity to meet the A-side power center and B-side power center electrical loads in accordance with modular data center facility full-load requirements, where the modular-critical-power-distribution skids in the redundant power center configuration provide for concurrent maintainability for all cooling system electrical loads as well as other electrical loads classified as critical in the modular data center facility.

9. The system of claim 8,
where input power from a Utility Power grid feed to the first modular-critical-power-distribution skid and the second modular-critical-power-distribution skid is delivered from two separate switchboards, where one switchboard comes from each modular-critical-power-distribution skid, and the first and second modular-critical-power-distribution skids are electrically connected via two cross tie circuit breakers housed in the power distribution cabinets that operate in the normally closed position.

10. The system of claim 1,
where an electrical power output of each uninterruptable power supply is distributed through its own distribution switchboard in the power distribution cabinets,
where each distribution switchboard is equipped with a maintenance bypass breaker with control logic to ensure the uninterruptable power supply has transferred to bypass before the maintenance bypass breaker can be engaged to the electrical power output of the distribution switchboard,
where the control logic ensures that this will always be a closed transition transfer so that electrical power to electrical loads classified as critical will never be lost.

11. The system of claim 1, where each modular-critical-power-distribution skid has a manual or fully automated cross tie breaker inside its power distribution cabinets, where the cross tie breaker has a control system to cause for full electrical load transfers to be powered from either the first modular-critical-power-distribution skid or the second modular-critical-power-distribution skid while maintaining continuous uninterruptable power to electrical loads classified as critical on both the A-side power and the B-side power in an event when a detector determines that one of the modular-critical-power-distribution skids has failed.

12. The system of claim 1,
where multiple power distribution units per modular-critical-power-distribution skid are electrically connected to the uninterruptable power supply of a skid via one or more circuit breakers in the power distribution cabinets mounted on the steel-framed support structure of the skid,
where the multiple power distribution units are electrically connected in an alternating A-side power/B-side power arrangement in a data hall to provide electrical power to electrical loads classified as critical via 1) an overhead bus way, 2) a Remote Power Panel, or 3) from panels within the multiple power distribution units and
where each power distribution unit has a step down transformer to convert a supplied input Volts AC into an outputted lower Volts AC,
where each individual power distribution unit feeds electrical power to a portion of critical electrical power loads in the modular data center facility, and
where each power distribution unit has a paired circuit breaker and power monitoring meter going to critical power computing equipment loads in a data floor portion of the modular data center facility.

13. The system of claim 1,
where the first modular-critical-power-distribution skid includes a first electrical connection to a Utility Power-grid step-down voltage transformer that steps down a Utility Power-grid into a standard working voltage that feeds into a main power supply input circuit breaker located in a Main Switchboard on the skid, a second electrical connection to a standby critical power source that feeds into a standby critical power supply circuit breaker also located in the Main Switchboard, a series of circuit breakers in the power distribution cabinets provide fault protection to components in the cooling system and the electrical computing equipment loads;
where the uninterruptable power supply has a static bypass switch and a battery backup power supply,
where each power distribution cabinet electrically connects to a series of power distribution units, and a circuit breaker in the Main Switchboard connects to one or more automatic transfer switches to provide the N+1 System redundancy for the cooling system for the HVAC RTUs that cool the power centers, and a set of logic for the skid is configured to select either a Utility Power-grid power source or a standby critical power generator to supply electrical power to the uninterruptable power supply.

14. A method of supplying redundant power to electrical loads in a modular data center facility with a set of two or more modular-critical-power-distribution skids arranged in a redundant power supply configuration, comprising:
using a first modular-critical-power-distribution skid housed in a first hardened building to supply power as an A-side power for the electrical loads;
using a second modular-critical-power-distribution skid housed in a second hardened building to supply power as a B-side power for the electrical loads,
where each modular-critical-power-distribution skid is assembled with an uninterruptable power supply, multiple power distribution cabinets, and an environmental control system,
where each modular-critical-power-distribution skid is pre-wired and pre-engineered for the uninterruptable power supply, the multiple power distribution cabinets, and the environmental control system in an off-site facility prior to being installed in the modular data center facility as a monolithic pre-wired preassembled integrated platform, and
where the uninterruptable power supply is electrically and mechanically connected into the multiple power distribution cabinets, all of which are mounted onto a steel framed support structure, which supports a weight of those uninterruptable power supplies and power distribution cabinets; and
where the environmental control system controls a cooling system for the first and second modular-critical-power-distribution skids, and electrical power from the A-side power and the B-side power connects in a redundant power configuration to electrical loads in the cooling system,
where each power center of a number of power centers contains its own modular-critical-power-distribution skid and is cooled by multiple packaged Heating, Ventilation, and Air Condition (HVAC) Roof-Top Units (RTU) providing 2 N system redundancy for the cooling system for each power center,
where electrical power for each HVAC roof-top unit that cools the power centers is available from both the A-side power from its own circuit breaker in the power distribution cabinets in the first modular-critical-power-distribution skid and the B-side power from its own circuit breaker in the power distribution cabinets in the second modular-critical-power-distribution skid, and
where each modular-critical-power-distribution skid has the cross tie breaker inside its power distribution cabinets to allow at least the first modular-critical-power-distribution skid to supply both the A-side power and the B-side power in the redundant power configuration when the cross tie breaker is closed and the first modular-critical-power-distribution skid is operational.

15. The method of claim 14,
where in a failure event of a first HVAC RTU that cools the power centers is detected by the environmental control system, the environmental control system ensures enough HVAC RTUs operates to supply cooling with enough capacity to meet the A-side power and B-side power electrical loads in accordance with modular data center facility room full-load requirements.

16. The method of claim 15,
where the servers, storage devices, routers, and switches in the modular data center facility are cooled by a second set of two or more packaged HVAC roof top units that cools modular data center facility electrical loads,
where electrical power for the second set of HVAC roof-top units is available from both the A-side power from a first circuit breaker in the power distribution cabinets in the first modular-critical-power-distribution skid and the B-side power from a second circuit breaker in the power distribution cabinets in the second modular-critical-power-distribution skid via one or more automatic transfer switches, and in a failure event of a first packaged HVAC RTU in the second set of packaged HVAC roof top units that cools the modular data center facility electrical loads is detected by the environmental control system, then the environmental control system ensures another packaged HVAC RTU in the second set of packaged HVAC roof top units operates to supply cooling with enough capacity to meet the A-side power and the B-side power electrical loads in accordance with the modular data center facility full-load requirements.

17. The method of claim 14,
where the cooling system is mechanical and also has a hardened modular container;
where wall sections forming the first hardened building containing the first modular-critical-power-distribution skid and wall sections forming the second hardened building containing the second modular-critical-power-distribution skid have reinforced frameworks to meet Miami-Dade County standards to withstand up to 149 mph winds and a 1.5 seismic importance factor,
where the wall sections forming the hardened buildings are connected to a foundation, and
where the first hardened building bridges with a mechanical platform to the second hardened building; and
where two or more standby critical power generators connect to the first modular-critical-power-distribution skid,
where each standby critical power generator electrically connects to one of the power distribution cabinets on its own corresponding modular-critical-power-distribution skid and then via the cross tie breaker of that skid supplies critical power to both the A-side power and the B-side power, and
where each standby critical power generator is installed outdoors in a weather protective enclosure.

18. The method of claim 14,
where the uninterruptable power supply in each skid incorporates a valve-regulated lead-acid battery backup component configured to supply electrical loads in the modular data center facility for at least several minutes from that uninterruptable power supply, and each uninterruptable power supply has a dedicated external static bypass switch configured such that 1) when an inverter of the uninterruptable power supply detects failure or 2) the battery backup component of the uninterruptable power supply runs below a minimum threshold voltage, then the static bypass switch ensures an electrical load changes over automatically onto a main AC electrical power input feed.

19. The method of claim 14,
where each modular-critical-power-distribution skid incorporates a modular fault tolerant control system,
where the uninterruptable power supply of each skid is configured to deliver continuous conditioned power to the electrical loads that are classified as critical in the modular data center facility and each skid has interlocked circuit breakers in the power distribution cabinets to open and isolate the circuit breakers electrically near a detected fault to isolate that fault from affecting the rest of the modular data center loads,
where in a failure event of the first modular-critical-power-distribution skid is detected by the fault tolerant control system, then the fault tolerant control system ensures the second modular-critical-power-distribution skid operates to supply electrical power with enough capacity to meet A-side power center and B-side power center electrical loads in accordance with modular data center facility full-load requirements,
where the modular-critical-power-distribution skids in the redundant power configuration provide for concurrent maintainability for all the cooling system electrical loads as well as electrical loads classified as critical in the modular data center facility,
where input power from a Utility Power grid feed to the first modular-critical-power-distribution skid and the second modular-critical-power-distribution skid is delivered from two separate switchboards,
where one switchboard comes from each modular-critical-power-distribution skid, and the first and second modular-critical-power-distribution skids are electrically connected via two cross tie circuit breakers housed in the power distribution cabinets that operate in the normally closed position.

20. The method of claim 14,
where the first modular-critical-power-distribution skid has the cross tie breaker inside its power distribution cabinets,
where the cross tie breaker has a control system to cause for full electrical load transfers to be powered from either the first modular-critical-power-distribution skid or the second modular-critical-power-distribution skid while maintaining continuous uninterruptable power to electrical loads classified as critical on both the A-side power and the B-side power in an event when a detector determines that one of the modular-critical-power-distribution skids has failed.

* * * * *